United States Patent [19]

Zajac

[11] Patent Number: 4,958,658
[45] Date of Patent: Sep. 25, 1990

[54] MASS FLOW STABILIZED

[75] Inventor: John P. Zajac, San Jose, Calif.

[73] Assignee: Tegal Corporation, Petaluma, Calif.

[21] Appl. No.: 66,801

[22] Filed: Jun. 25, 1987

[51] Int. Cl.$^5$ ............................................. E03B 5/00
[52] U.S. Cl. .................................. 137/613; 137/568; 251/118
[58] Field of Search ................. 137/613, 568; 251/118

[56] References Cited

U.S. PATENT DOCUMENTS

| | | | |
|---|---|---|---|
| 322,002 | 7/1885 | Phillips et al. | 137/613 |
| 3,885,590 | 5/1975 | Ford et al. | 137/613 |
| 4,263,939 | 4/1981 | Bird | 137/613 |
| 4,341,237 | 7/1982 | Stauffer | 137/613 |

Primary Examiner—A. Michael Chambers
Attorney, Agent, or Firm—Paul F. Wille

[57] ABSTRACT

A mass flow stabilizer utilizes a restriction and a chamber for the dampening of pressure fluctuations between a gas pressure regulator and a mass flow controller.

2 Claims, 1 Drawing Sheet

MASS FLOW STABILIZED

This invention relates to a device for stabilizing fluctuations in pressure and flow of gases and is used in conjunction with mass flow controllers (MFC's), which are known per se in the art.

In the prior art, gas is supplied to a plasma reactor, for example, from a source by way of a pressure regulator, an MFC, and interconnecting gas lines. As known in the art, a plasma reactor operates at less than atmospheric pressure for etching or deposition.

The purpose of the MFC is to provide a controlled, stable gas flow. The problem which was not previously known is that MFC's are sensitive to small pressure fluctuations at the input side thereof. These small fluctuations can cause larger fluctuations in the output. This is further complicated in that the MFC indicates that the proper flow is being maintained. Thus, there is no indication that a problem exists. The small pressure fluctuations on the input side are caused by fluctuations in gas pressure from the regulator. Since pressure regulators control pressure via a spring loaded valve, while an average constant gas pressure is maintained there is a range of pressure fluctuations to either side of the mean. It is these small pressure fluctuations which cause the error in the MFC's.

It is an object of the present invention to provide a new and improved mass flow stabilizer for a gas line.

It is a further object of the present invention to provide a mass flow stabilizer which will increase the effectiveness of a mass flow controller.

It is a further object of the present invention to provide a substantially constant gas pressure to a mass flow controller.

SUMMARY OF THE INVENTION

The foregoing objects are achieved in the present invention wherein the gas line interconnecting the regulator and the MFC is provided with a restriction and chamber to dampen variations in pressure in the line. The restriction and chamber are chosen relative to the maximum flow of the MFC for maximum effectiveness.

A more complete understanding of the present invention can be obtained by considering the following detailed description in conjunction with the accompanying drawings, in which:

PREFERRED EMBODIMENT

Figure 1:
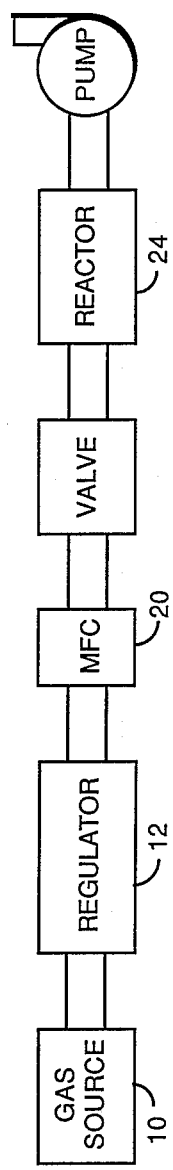
FIG. 1 is a simplified block diagram of a prior art mass flow control gas line.

FIG. 1 is a block diagram of a gas supply system of the prior art. Its purpose is to supply a gas at a constant pressure and flow rate to reactor 24 for plasma etching or plasma deposition. Gas pressure regulator 12 is set to release a gas from gas source 10 at a predetermined pressure. Since, in many of its uses, the gas must be at extremely low pressure; small pressure fluctuations frequently occur. The type of regulator used cannot keep the pressure precisely constant at the low pressures required. These small pressure fluctuations occur above and below the preset pressure, but average to be the pressure required. Thus, the indication is that the pressure of gas being released is correct. This gas is then supplied to MFC 20 which controls the flow rate. The small quick fluctuations in pressure cause MFC 20 to compensate, which, due to the small values and quickness of the changes results in over compensation and in an output with even larger fluctuations.

Figure 2:
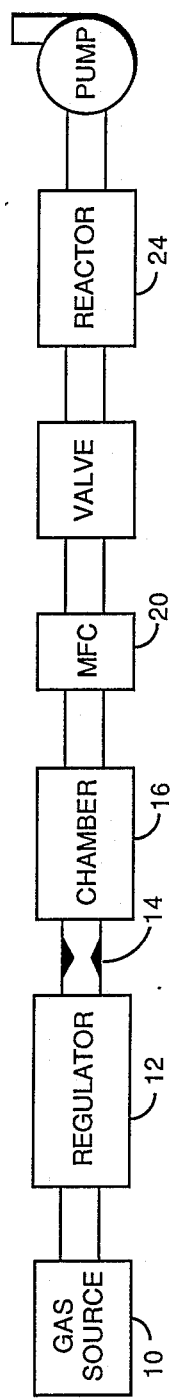
FIG. 2 is a block diagram of a mass flow stabilizer in a MFC gas line embodying the present invention.

FIG. 2 is a block diagram of the preferred embodiment of the present invention. Between gas pressure regulator 12 and mass flow control (MFC) 20 is restriction 14 and chamber 16. While MFC 20 is incapable of adjusting to compensate for the small and quick pressure fluctuations from pressure regulator 12 it is capable of adjusting for slower more gradual changes in pressure. To this end restriction 14 and chamber 16 are inserted between regulator 12 and MFC 20 to dampen out the fluctuations in pressure. The best dampening was found to exist when the restriction was located near the regulator and sized so that at a predetermined delivery pressure the restricter would permit a flow only slightly greater than the flow rate of the MFC installed on that line. A volume 16, for containing a quantity of gas is also located between regulator 12 and MFC 20. The volume of chamber 16 must be equal to or greater than the volume of gas which can flow through MFC 20 in one minute. In this embodiment chamber 16 is located after restriction 14. Restriction 14 and chamber 16 act to dampen the fluctuations in pressure from pressure regulator 12 and thus allow MFC 20 to function properly, thereby reducing the fluctuations in its output and releasing a substantially constant flow of gas.

Thus, a mass flow stabilizer has been devised which will allow the proper functioning of an MFC in a gas line, reducing the pressure fluctuations from a gas pressure regulator to levels that can be compensated by the MFC.

Having thus described the invention, it will be apparent to those skilled in the art that various modifications can be made within the spirit and scope of the present invention. For example, while in the preferred embodiment a single restriction and a single chamber is used, more sets of these devices can be used, seriatim or in parallel, to accommodate the particular system used.

I claim:

1. In a gas delivery system wherein a mass flow controller is connected in a gas line between a source of gas and a device in which the gas is used, the improvement comprising a mass flow stabilizer interposed in said line for dampening small pressure fluctuations, said mass flow stabilizer comprising restriction means connected to said source, wherein said restriction means is characterized by a flow rate slightly greater than that of said mass flow controller, and chamber means connected to said restriction means and said mass flow controller.

2. In a gas delivery system wherein a mass flow controller is connected in a gas line between a source of gas and a device in which the gas is used, the improvement comprising a mass flow stabilizer interposed in said line for dampening small pressure fluctuations, said mass flow stabilizer comprising restriction means connected to said source, and chamber means connected to said restriction means and said mass flow controller, wherein said chamber means has a volume equal to or greater than the volume of gas flowing through said mass flow controller in one minute.

* * * * *